(12) United States Patent
Deyts et al.

(10) Patent No.: US 10,196,767 B2
(45) Date of Patent: Feb. 5, 2019

(54) METHOD FOR DRAPING COMPOSITE MATERIALS ON A FORM AND MATERIAL SUITABLE FOR SAID METHOD

(71) Applicant: ASTRIUM SAS, Suresnes (FR)

(72) Inventors: Jean-Baptiste Deyts, Bordeaux (FR); Florian Chotard, Nantes (FR); Eric Soccard, Blain (FR)

(73) Assignee: AIRBUS DEFENCE & SPACE SAS (FR)

( * ) Notice: Subject to any disclaimer, the term of this patent is extended or adjusted under 35 U.S.C. 154(b) by 1083 days.

(21) Appl. No.: 14/375,190

(22) PCT Filed: Jan. 28, 2013

(86) PCT No.: PCT/EP2013/051565
§ 371 (c)(1),
(2) Date: Jul. 29, 2014

(87) PCT Pub. No.: WO2013/113653
PCT Pub. Date: Aug. 8, 2013

(65) Prior Publication Data
US 2015/0004867 A1    Jan. 1, 2015

(30) Foreign Application Priority Data
Jan. 30, 2012 (FR) .................................... 12 50861

(51) Int. Cl.
*D04H 3/11* (2012.01)
*B29C 70/54* (2006.01)
(Continued)

(52) U.S. Cl.
CPC ............... *D04H 3/11* (2013.01); *B29C 70/30* (2013.01); *B29C 70/54* (2013.01); *D04H 1/46* (2013.01); *D04H 1/485* (2013.01); *D04H 1/559* (2013.01); *D04H 3/002* (2013.01); *D04H 3/07* (2013.01); *D04H 3/105* (2013.01); *Y10T 442/60* (2015.04); *Y10T 442/682* (2015.04); *Y10T 442/689* (2015.04)

(58) Field of Classification Search
None
See application file for complete search history.

(56) References Cited

U.S. PATENT DOCUMENTS 5,401,446 A * 3/1995 Tsai .................... B01D 39/1615
204/165
5,482,765 A * 1/1996 Bradley .................. A61L 15/22
428/903

(Continued)

FOREIGN PATENT DOCUMENTS

EP    1923192    5/2008

OTHER PUBLICATIONS

International Search Report, International Application No. PCT/EP2013/051565, dated Apr. 3, 2013, (3 pages).

*Primary Examiner* — Monica A Huson
(74) *Attorney, Agent, or Firm* — Perman & Green, LLP

(57) ABSTRACT

The subject matter of the invention is a method for draping on a form, which includes a step of deposition on the form of a first fold support in the form of one or more polymer nonwoven fabrics. The invention further relates to a thermoplastic nonwoven material manufactured with a nonwoven fabric of polymer fibers.

13 Claims, 4 Drawing Sheets

(51) Int. Cl.
  *B29C 70/30*   (2006.01)
  *D04H 3/105*   (2012.01)
  *D04H 3/002*   (2012.01)
  *D04H 3/07*   (2012.01)
  *D04H 1/46*   (2012.01)
  *D04H 1/485*   (2012.01)
  *D04H 1/559*   (2012.01)

(56)     References Cited

U.S. PATENT DOCUMENTS

| | | | |
|---|---|---|---|
| 5,883,026 A * | 3/1999 | Reader | A41D 13/11 128/206.12 |
| 2004/0192137 A1 * | 9/2004 | Starkey | B29C 70/086 442/286 |
| 2005/0075029 A1 * | 4/2005 | Ogawa | B32B 5/02 442/327 |
| 2008/0220161 A1 | 9/2008 | Sommer et al. | |

* cited by examiner

METHOD FOR DRAPING COMPOSITE MATERIALS ON A FORM AND MATERIAL SUITABLE FOR SAID METHOD

CROSS REFERENCE TO RELATED APPLICATIONS

This application is the National Stage of International Application No. PCT/EP2013/051565, having an International filing date of, 28 Jan. 2013, which designated the United States of America, and which International Application was published under PCT Article 21 (s) as WO Publication 2013/113653 A1 and which claims priority from, and benefit of French Application No. 1250861, filed on 30 Jan. 2012, the disclosures of which are incorporated herein by reference in their entireties.

BACKGROUND

The presently disclosed embodiment relates to a process of drape forming composite materials and to a material suitable for this process.

It applies to the use of thermoplastic composite materials in drape forming to produce large structural parts of complex shape.

Within the context of the drape forming of composite materials, it is necessary to enable the coupling of a first layer of composite material to the tool in order to enable the drape forming of the part.

The solutions that enable the drape forming must also be compatible with an automated drape forming using laser heating of the composite.

Thermoplastic materials do not have a tacky nature at ambient temperature. This state prevents the coupling thereof to a tool during the use thereof. Although simple means, for example adhesive tape, exist for small flat formers, the problem has not been solved in order to allow the coupling of sheets laid up on complex formers. If the first ply cannot be coupled to the tool, this will prevent the production of the part.

In order to solve this problem, it is advisable to develop a technical solution that will enable the coupling of a first ply to a complex tool during the laying up thereof. This solution must also enable the part to be removed from the mold at the end of the drape forming or consolidation. Finally, this solution must make it possible to retain the drape-forming precision of the machine, specifically excessive deformation of the first ply could disturb the lay-up and lead to gaps and/or overlaps of the laid up sheets which would adversely affect the soundness of the final material and also the mechanical performances thereof.

The problems that must be solved by the solutions to the problem of drape forming large parts, in particular of complex or non-developable shape, using a tool that represents a former of the part, are the following:
  deformation/conformation on tool;
  compatibility with the matrix of the composite;
  coupling of the composite to the solution;
  stability during the drape forming;
  ability to be removed from the mold after consolidation.
Among the solutions identified in the past are:
  the production of a hoop,
  applying a vacuum,
  the use of a polymer film and in particular of a PEEK film.

A hoop consists in carrying out winding around the tool on which the drape forming is desired. The fact of having a continuity of fibers around the tool combined with peripheral mechanical clamping (adhesive tape for example) makes it possible to hold the material on the drape forming zone. This first layer enables the whole of the part to be laid up, but generates many losses on the rear face of the tool since the material of the winding on this face will be unused thereby. This solution nevertheless remains a reference solution for rotational parts such as cylinders.

The technique of applying a vacuum consists in holding the material on the drape-forming zone by means of a vacuum created by suction. For this, the drape forming is carried out on a perforated surface connected to a suction circuit. When the drape forming begins, the suction circuit is activated and the material is held on the working zone. However, the material, for example, carbon fibers, penetrates into the suction orifices which deforms it and leads to a degradation of the properties of the final material. This solution furthermore has a cost premium for the process since it requires the production of a complex tool with integrated vacuum circuit.

Finally, the use of polymer films is not very well suited to the drape forming of complex shapes since the latter will lead to creases of the film that will generate variations in accuracy during the drape forming and local overthicknesses in the material. The use of a film requires a complex assembly in order to ensure it is held in position.

It is also possible to use a multi-perforated tool with an integrated vacuum circuit that is expensive or else to use the polymer film as a vacuum cover which requires the use and installation of drainage fabrics and of sealing mastic.

The latter option combines the drawback of requiring several hours of manual labor, which is detrimental to the operating efficiency of an automated drape forming machine, adding increased sensitivity in the case of a problem during the production of the first ply. This sensitivity is illustrated when it is necessary to remove the laid up rovings which are welded to the surface of the film, the latter tearing or having to be cut in order to carry out this operation. The system thus loses its leak tightness and can no longer meet the dimensional stability constraints nor those of the holding of the composite at the surface of the tool. It is thus necessary to replace the film or effect a repair in order to be able to carry out the drape forming, with, as a result, new manual operations which will be all the more costly in terms of time and materials when this occurs on a large-sized part.

SUMMARY

In view of this prior art, the presently disclosed embodiment proposes a novel solution that enables the coupling of a first ply made of a carbon/thermoplastic composite for producing parts of complex geometry using an automated drape-forming machine.

The objective of the presently disclosed embodiment is therefore to define a process and products that make it possible to manufacture parts made of thermoplastic composite materials:
  that enable the coupling of the first ply,
  without giving rise to creasing including during positioning on a complex, in particular unregulated, shape,
  with a brief positioning time,
  that do not deform the preform and ensure its geometrical integrity,
  by forming a thermal barrier between the metal tool (the mold, cold) and the part being melted which optimizes the coupling phenomenon even more.
The following requirements have also been considered:

need for a deformable solution in order to allow the production of parts with complex geometry, need for using a material that is compatible with the manufacturing cycle of the composite part and compatible with the processing temperature of the thermoplastic material, that is to say that melts at the same temperature, and therefore in the case where the thermoplastic is PEEK, of the order of 400° C., smallest possible impact on the total mass of the part, reduction and simplification of manual operations.

Within this context, the presently disclosed embodiment proposes a process of drape forming on a former which comprises a step of laying up on the former a first ply support in the form of one or more polymer nonwoven fabrics.

The process advantageously comprises a step of needlepunching the nonwoven fabric(s) prior to the lay-up.

The needlepunching step is preferably a needlepunching of 50 to 130 strokes/minute and preferably of the order of 110 strokes/minute.

Advantageously, the process additionally or alternatively comprises a step of hydroentangling the nonwoven fabric(s) prior to the lay-up.

The prior hydroentangling step is advantageously carried out at a pressure of the order of 40 to 80 bar and preferably of the order of 60 bar.

Advantageously, the process additionally or alternatively comprises a step of calendering the nonwoven fabric(s) prior to the lay-up.

According to one aspect of the disclosed embodiment, the process comprises needlepunching, hydroentangling and calendering steps prior to the lay-up, the order of the steps being needlepunching then hydroentangling then calendering.

According to one aspect of the disclosed embodiment, the nonwoven fabric(s) comprise(s) polymer fibers of a first nature.

The term "nature" is understood to mean material compatible with the matrix of the composite material to be drape formed.

Compatible means in particular, but not only, miscible, that is to say that the mixture thereof with the matrix of the composite material is single phase between ambient temperature and the melting points thereof.

The material of the nonwoven may in particular be the same as that of the matrix of the composite.

According to an aspect of the disclosed embodiment, the nonwoven fabric(s) comprise(s) polymer fibers of two different natures.

In this case, one of the materials is a material compatible with the matrix of the composite, it being possible for the other to have a higher melting point and to act in particular as reinforcement.

Advantageously, the process comprises a step of clamping the nonwoven fabric(s) to the former.

The clamping step preferably comprises a clamping selected from a mechanical clamping using screwed or clamped blocks, an electromagnetic clamping with the aid of a magnet, clamping by means of adhesive tapes or clamping by coupling strips.

Advantageously, the process comprises a step of melting the material of the nonwoven fabric(s).

According to an aspect of the disclosed embodiment, the process comprises a step of introducing resin by partial melting of polymer fibers of the nonwoven fabric(s).

The presently disclosed embodiment also relates to a material for producing a first drape-forming ply, said material being a thermoplastic nonwoven manufactured with a nonwoven fabric of polymer fibers.

According to an aspect of the disclosed embodiment, the polymer fibers comprise PEEK.

According to an aspect of the disclosed embodiment, the polymer fibers comprise PEI.

According to another aspect, the polymer fibers comprise polyamide.

The material advantageously comprises from 60% to 70% of PEEK fibers.

According to an aspect of the disclosed embodiment, the polymer fibers consist of 100% PEEK fibers.

According to an aspect of the disclosed embodiment, the material preferably consists of a needle-punched nonwoven.

According to an aspect of the disclosed embodiment, the material consists of a hydroentangled nonwoven.

According to the disclosed embodiment, the material consists of a calendered nonwoven.

The aspects of the disclosed embodiment also relate to a thermoplastic nonwoven material characterized in that it is manufactured with a successive implementation of needlepunching, hydroentangling and calendering of a nonwoven fabric of polymer fibers.

BRIEF DESCRIPTION OF THE DRAWINGS

Other features and advantages of the disclosed embodiment will become apparent on reading the description which follows of exemplary aspects of the disclosed embodiment with reference to the drawings which represent.

DETAILED DESCRIPTION

Figure 1:
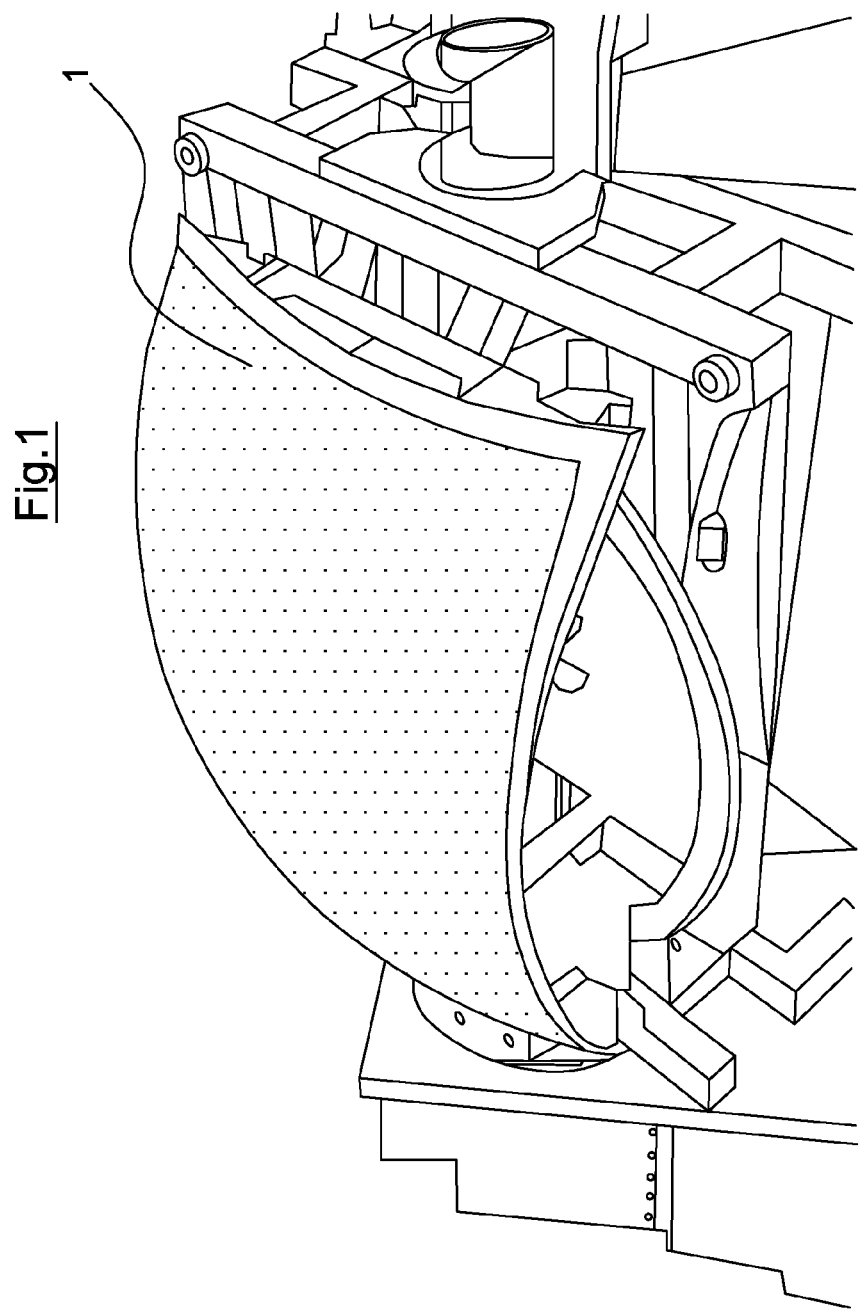
FIG. 1: shows an example of a tool or former for producing a non-developable composite part.

The presently disclosed embodiment proposes the use of a nonwoven based on polymer fibers as a base layer for the drape forming of a part on a former 1, an example of which is given in FIG. 1.

The solution mainly envisaged in the presently disclosed embodiment is the use of a first ply in the form of nonwoven polymer fabric(s). The latter meet(s) the two-fold constraint of deformability and compatibility with the matrix of the composite.

Unlike a woven fabric where the arrangement of fibers is defined by a weave, a nonwoven has a random arrangement of fibers. This enables it to have a more homogeneous behavior in the plane compared to a woven fabric which has two favored directions (warp and weft yarns). Depending on its construction, a nonwoven is more deformable than a woven fabric, it thus conforms to complex shapes without generating creases, unlike woven fabrics. This property makes it possible to eliminate the risks of inaccuracies of lay-up or of deviation of the sheets in different zones.

The steps of manufacturing a nonwoven comprises the following steps:

opening of the fibers or blending of the fibers;
carding;
lapping;

needlepunching, hydroentangling and/or calendering, the calendering being carried out hot at a temperature that makes it possible to melt the nonwoven;

conditioning.

The drape forming tests were carried out on a ¼ sphere tool or former 1 as represented in FIG. 1. Two references of materials were tested during this session:

| ID | PEEK | Needle-punching | Hydro-entangling | Calen-dering | Cou-pling | deformation |
|---|---|---|---|---|---|---|
| 1 | 100% | 55 strokes/min | no | no | very good | poor |
| 2 | 100% | 55 strokes/min | 40 bar | no | very good | good |

The nonwoven No. 1 measures 1.10 m wide; it is therefore possible to cover the whole of the quarter sphere tool with this material. Clamping is provided at the periphery of the tool using polyimide adhesive tape.

If the coupling is good, the intrinsic deformation of the nonwoven ID1 associated with the peripheral clamping appears large, and it is not optimal when there are great requirements of accuracy of lay-up of the rovings. This reference of nonwoven must then be improved.

The nonwoven was modified by hydroentangling, a method of mechanically binding individual fibers which uses high-pressure water jets; this led to the nonwoven ID2 by increasing its mechanical strength and decreasing its deformability.

The hydroentangling machine used for the tests measures 500 mm wide which limits the width of nonwoven strip to 400 mm.

Figure 2:
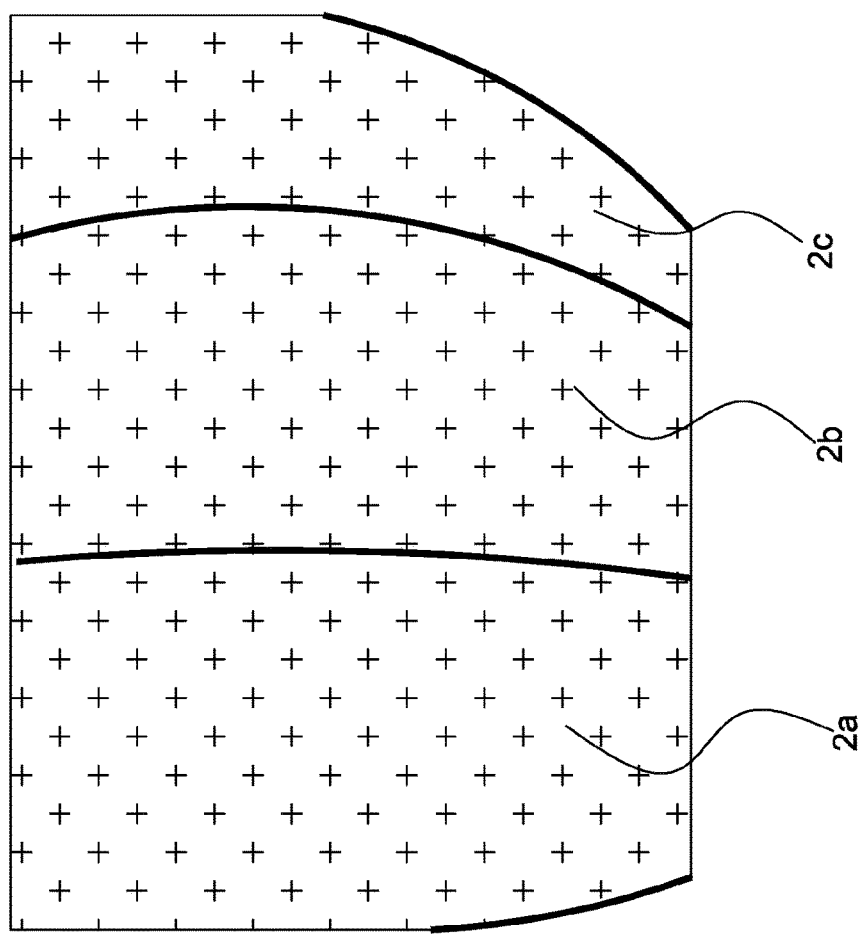
FIG. 2: shows a view of a lay-up of three strips forming a first ply according to the invention on the former from FIG. 1.

For the tests, as represented in FIG. 2, three strips 2a, 2b, 2c of this new nonwoven are positioned side-by-side on the tool to enable the drape forming.

Various clamping configurations were then tested and the one offering the best guarantees is based on a double-sided adhesive tape positioned at the periphery of the part but under the drape forming zone in the overlength zone of the part. For this clamping, several squares of double-sided adhesive tape are positioned between the strips to prevent them sliding relative to one another.

Figure 3:
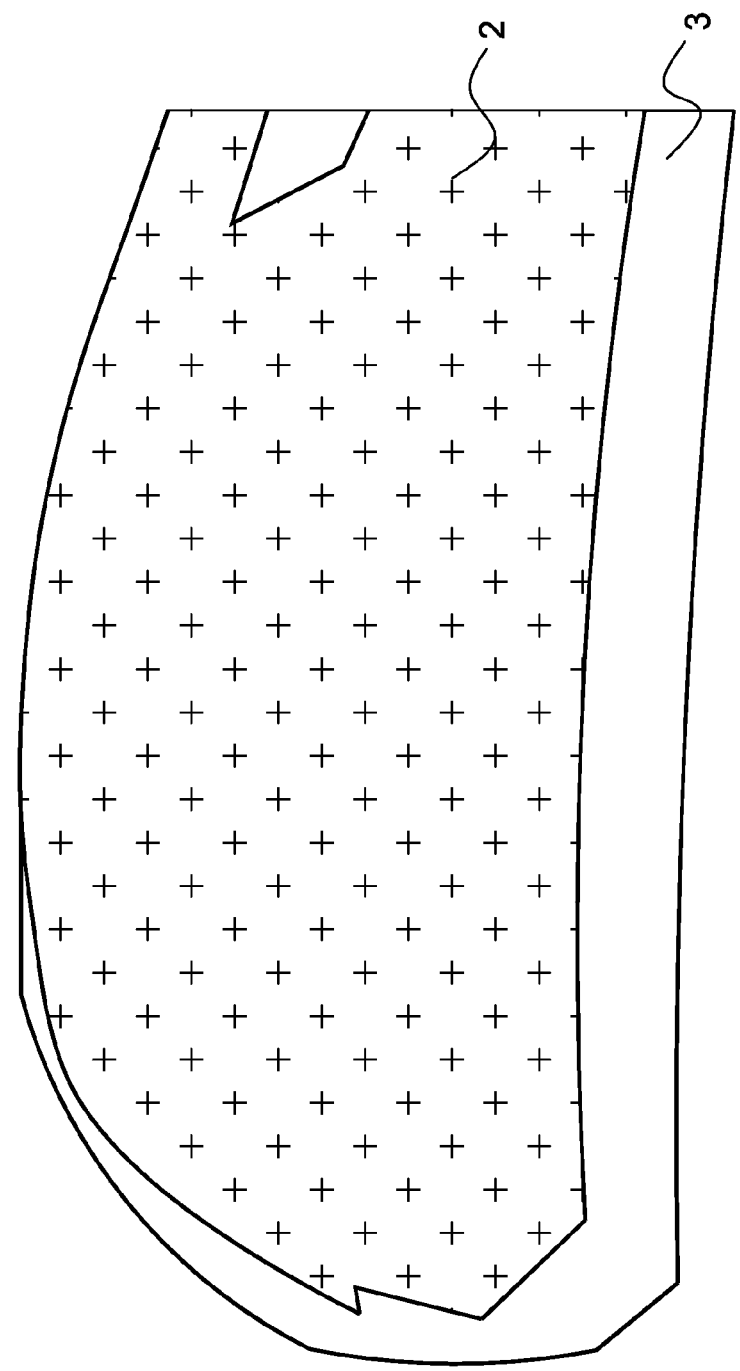
FIG. 3: shows a view of an example of clamping of a first ply according to the invention to the former from FIG. 1.

FIG. 3 gives an example of gripping of the nonwoven 2 by peripheral anchoring 3 with an adhesive tape, for example a thermalimide adhesive tape.

The positioning is carried out by stretching the fabric over the former. The deformability of the nonwoven on a non-developable former is sufficient and it is positioned without creating creases. In the case of a surface that is more complex, bigger or associated with a more pronounced curvature, provision is made for cuts and assembling by welding.

Figure 4:
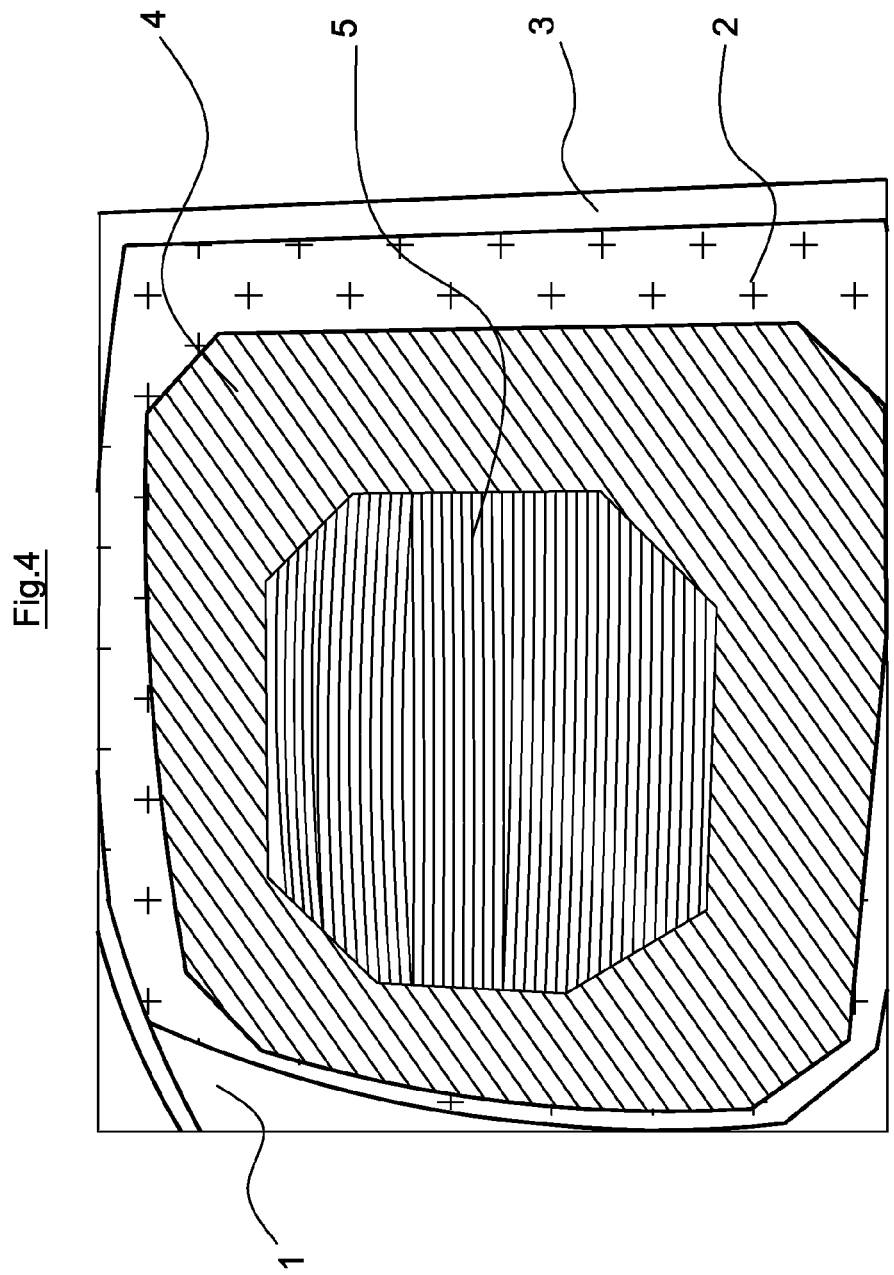
FIG. 4: shows a view of a drape forming produced on the first ply from FIG. 3.

At the end of the drape forming on the configuration from FIG. 2, as represented in FIG. 4, no gap greater than 1 mm is visible between sheets 4 and no defect is visible during the drape forming of six supplementary plies 5. This reference of nonwoven associated with this clamping method therefore constitutes a satisfactory solution for coupling a first ply.

A second series of tests was carried out, to better specify the conditions for manufacturing a satisfactory nonwoven, by evaluating in particular the deformability of the products and the coupling function.

In order to achieve this objective, three aspects were more particularly studied, the first consisting in increasing the mechanical anchorage by doubling the needlepunching frequency, the second relating to the hydroentangling conditions and the third consisting in calendering the nonwoven in order to melt the fibers at the surface.

In order to reduce the calendering temperature below the melting point of PEEK (T° m=340° C.), fibers of PEI and of PEEK were mixed. This new nonwoven was then calendered at 300° C. in order to melt the PEI fibers.

A nonwoven was also manufactured with black PEEK fibers in order to demonstrate a possible improvement in behavior during laser lay-up.

The various references produced are presented in the table below:

| ID | PEEK | PEI | Needlepunching | Hydroentangling | Calendering |
|---|---|---|---|---|---|
| 2 | 100% | 0 | 55 strokes/min | 40 bar | no |
| 3 | 66% | 34% | 110 strokes/min | 60 bar | yes |
| 4 | 66% | 34% | 55 strokes/min | 60 bar | no |
| 5 | 0 | 100% | 55 strokes/min | 40 bar | yes |
| 6 | 85% black | 15% | | | no |

The drape-forming tests were carried out on a flat tool. Three sheets each composed of eight rovings of structural composites containing carbon fibers and having a polymer matrix, known for example under the reference AS4/PEKK FC, of ¼ inch, were draped side-by-side over the various nonwovens.

The dimensions of the draped plies are therefore 305 mm wide by 1100 mm long. The dimensions of the nonwovens were 500 mm×1200 mm.

The clamping of the nonwovens was provided by adhesive tape at the periphery. The various configurations tested and the results obtained are presented in the table below:

| ID | Coupling | Deformation |
|---|---|---|
| 2 | very good | good |
| 3 | very good | very good |
| 4 | very good | good |
| 5 | very good | poor |
| 6 | very poor | / |

These results show:

that a PEEK nonwoven or a PEEK/PEI nonwoven comprising from 60% to 70% of PEEK constitutes a material that is adequate for the application;

that needlepunching and in particular needlepunching of 50 to 130 strokes/minute and preferably of 110 strokes/minute with a tolerance of 5% to 10% gives a greater strength to the nonwoven;

that hydroentangling of the order of 40 to 80 bar and more specifically of 60 bar with a tolerance of 5% to 10% is advantageous.

The drape-forming tests have brought to light the importance of clamping the nonwovens. Specifically, depending on the positioning of the clamping, the accuracy of the drape forming varies.

It was therefore necessary to develop effective clamping solutions. Several types of clamping can be used:

mechanical clamping using screwed or clamped blocks;
electromagnetic clamping using a magnet;
clamping with coupling strips, for example known under the trademark Velcro.

During the drape forming, it is advisable to take into account the movements of the lay-up head over and around the drape forming zone. This is why block clamping systems, which create overthicknesses, are positioned at the periphery of the tool.

This arrangement limits their effectiveness.

One alternative solution is based on the use of polymer (in this case PEEK) coupling strips positioned as close as possible to the part without disturbing the drape forming thereof.

The use of such coupling strips makes it possible to distribute the coupling zones of the nonwoven over the former, certain coupling strips being positioned under portions intended to receive the drape forming which makes it possible in particular to produce parts with concave or convex shapes.

The tests carried out show that the nonwovens therefore represent a suitable solution for the coupling of the first ply of drape-formed thermoplastic composites.

Various nonwovens were manufactured and tested and several proved to be applicable for this application. The main advantages of polymer nonwovens are:

adaptation to all tool geometries,
limited additional mass on the final part;
total compatibility with the manufacturing matrix;
constitute a solution for enriching the surface with polymer for subsequent welding operations;
simplicity of use (no vacuum cover to manufacture, etc.).

The effectiveness of the solution of the presently disclosed embodiment nevertheless remains linked to the effectiveness of its clamping to the tool.

For the present application, the fibers of the nonwoven are advantageously of the same material as the thermoplastic material to be used, in particular PEEK, or use a material having a lower melting point in order to facilitate the coupling of the first ply to the nonwoven.

The use of PEEK fibers or of a mixture of PEEK/PEI fibers makes the solution compatible with drape forming and consolidation of the part. Furthermore, PEEK will melt at the surface during drape forming in the same way as the matrix of the laid-up prepreg and promote the adhesion of the sheet to the tool. It will finally blend perfectly with the resin of the composite during the consolidation of the part to give a composite and thus provide a surface rich in resin that will be able to be of use for possible subsequent welding operations.

The prepreg material must be by nature "compatible" with the matrix of the composite material.

As seen previously, compatible means in particular, but not only, miscible, that is to say that the mixture of the prepreg material with the matrix of the composite material is single phase between ambient temperature and the melting points thereof.

According to a first solution, the material of the nonwoven is advantageously the same as that of the matrix.

In the description, PEEK is used for a PEEK matrix.

It is also possible to use PEEK/PEI blends, the PEI making it possible to decrease the melting point and to facilitate calendering.

These materials are also suitable for a PEKK matrix.

For a polyamide matrix of PA-12 type, a nonwoven made of polyamide will be used.

The nonwovens used enable the coupling of the first ply without giving rise to creasing including during positioning on a complex, in particular unregulated, shape, their positioning time is brief, they do not deform the preform and ensure its geometrical integrity and they form a thermal barrier between the metal tool of the mold and the part being melted which optimizes the coupling phenomenon even more.

The material of the thermoplastic nonwoven type manufactured by successive implementation of needlepunching, hydroentangling and calendering is part of the presently disclosed embodiment.

What is claimed is:

1. A process of drape forming parts made of thermoplastic composite materials on a former, the process comprising:
    laying up on the former a support ply in the form of one or more polymer nonwoven fabrics;
    melting said support ply at a lower or equal temperature than the thermoplastic composite material of said part to provide a coupling surface for a first ply of a thermoplastic composite material part to be drape formed on the former;
    draping said first ply on said support ply;
    draping further plies of said part; and
    heating of the thermoplastic composite material part on said former and melting further at least part of said support ply of said polymer nonwoven fabric for promoting adhesion of the first ply of said part to the former.

2. The drape-forming process as claimed in claim 1, further comprising a step of needlepunching the one or more polymer nonwoven fabrics prior to the lay-up.

3. The drape-forming process as claimed in claim 2, wherein the needlepunching step is a needlepunching of 50 to 130 strokes/minute.

4. The drape-forming process as claimed in claim 1 further comprising a step of hydroentangling the one or more polymer nonwoven fabrics prior to the lay-up.

5. The drape-forming process as claimed in claim 4, wherein the prior hydroentangling step is carried out at a pressure of the order of 40 to 80 bar.

6. The drape-forming process as claimed in claim 1, further comprising a step of calendering the one or more polymer nonwoven fabrics prior to the lay-up.

7. The drape-forming process as claimed in claim 1, further comprising needlepunching, hydroentangling and calendering steps prior to the lay-up, the order of the steps being needlepunching then hydroentangling then calendering.

8. The drape-forming process as claimed in claim 1, wherein the one or more polymer nonwoven fabrics comprise polymer fibers of a first nature.

9. The drape-forming process as claimed in claim 1, wherein the one or more polymer nonwoven fabrics comprise polymer fibers of two different natures.

10. The drape-forming process as claimed in claim 1, further comprising a step of clamping the one or more polymer nonwoven fabrics to the former.

11. The drape-forming process as claimed in claim 10, wherein the step of clamping comprises a clamping selected from a mechanical clamping using screwed or clamped blocks, an electromagnetic clamping with the aid of a magnet, clamping by means of adhesive tapes or clamping by coupling strips.

12. The drape-forming process as claimed in claim 1, further comprising a step of melting the material of the one or more polymer nonwoven fabrics.

13. The drape-forming process as claimed in claim 1, further comprising a step of introducing resin by partial melting of the polymer fibers of the one or more polymer nonwoven fabrics.

* * * * *